United States Patent [19]

Buckingham

[11] Patent Number: 4,585,340

[45] Date of Patent: Apr. 29, 1986

[54] VACUUM PRINTING APPARATUS

[75] Inventor: Donald F. Buckingham, Chicago, Ill.

[73] Assignee: Buckingham Graphics, Inc., Chicago, Ill.

[21] Appl. No.: 551,016

[22] Filed: Nov. 14, 1983

[51] Int. Cl.$^4$ .............................................. G03B 27/20
[52] U.S. Cl. ........................................ 355/91; 355/113
[58] Field of Search ....................... 355/91, 113, 73, 76

[56] References Cited

U.S. PATENT DOCUMENTS

| | | | |
|---|---|---|---|
| 2,306,885 | 12/1942 | Klemm et al. | 355/76 |
| 3,042,356 | 7/1962 | Audino | 355/91 |
| 3,399,594 | 9/1968 | Leonhart | 355/73 |
| 3,658,014 | 4/1972 | Kranz et al. | 355/91 |
| 3,826,572 | 7/1974 | Duerr | 355/113 |

Primary Examiner—Monroe H. Hayes
Attorney, Agent, or Firm—Trexler, Bushnell & Wolters, Ltd.

[57] ABSTRACT

Vacuum printing apparatus is provided including a light box having an upwardly facing ground glass illuminated surface. A manually movable vacuum box is movable independently of the light box and is operated face down with a vacuum chamber above the photosensitive printing material and a transparency, the vacuum box resting on the light box for exposure.

3 Claims, 6 Drawing Figures

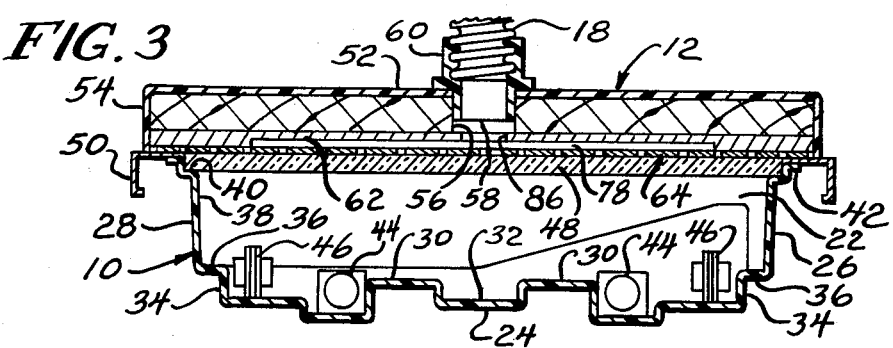
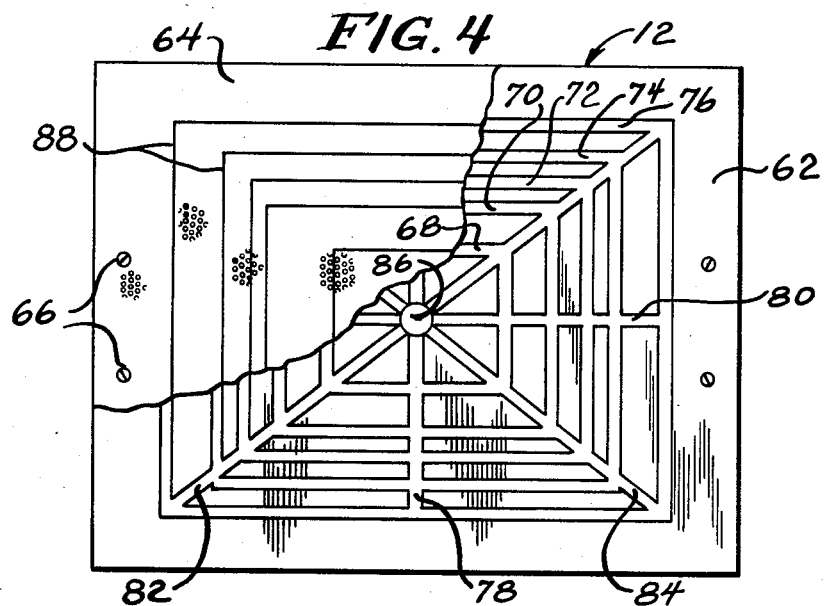
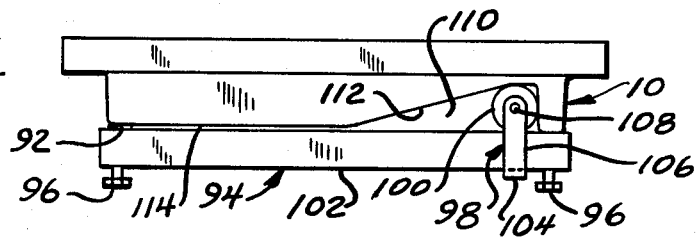
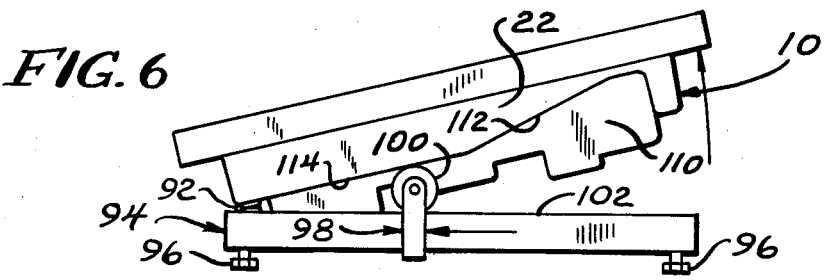

4,585,340

VACUUM PRINTING APPARATUS

BACKGROUND OF THE INVENTION

The present invention relates to the art of photographic printing. Prints may be made from an original, either a positive or a negative, on a photosensitive print base which may be opaque, such as paper, or transparent or translucent, such as plastic. The final print may be either a positive or negative print, and it may be chemically developed to be the opposite of the original, i.e., a negative to positive process, or it may be developed to be the same as the original, i.e., a positive to positive process.

In accordance with the principles of the present invention the reproduction is on a one-to-one scale. That is to say, the original and the copy are on a one-to-one basis. This is generally done by means of contact printing, as contrasted with the making of enlargements. For the utmost quality of reproduction both the original and the copy material should be held quite flat. It is known in the prior art to hold the copy or printing base material flat by means of a vacuum applied from beneath the printing table or base. To the best of my knowled9e such prior art vacuum printing apparatus has always had the supporting table or base below the print material. This has required projecting of light down on to the print material, either from an enlarging head, or from an overhead light source when the original material is in contact with the print material. This is disadvantageous in that light sources tend to be relatively fragile and are readily damaged upon being moved about.

There are many light boxes in the field, and many more are being sold on a continuing basis. A light box comprises a box-like structure containing one or more light sources, and preferably of a reflective or defusing nature to spread the light. The top surface of the light box comprises a frosted glass whereby transparencies can be laid out in a generally horizontal position on the frosted glass for viewing.

OBJECTS AND SUMMARY OF THE PRESENT INVENTION

It is an object of the present invention to use a light box, either an existing or new light box, in the art of vacuum printing.

More particularly, it is an object of the present invention to provide a vacuum printing apparatus lying above the printing paper or other copying material and adapted to rest on top of a light box, the light box then serving as the source of illumination for the making of a print.

In accordance with the present invention a light box is used in two different situations, thereby doing double duty. The light box is used in its usual sense to provide an illuminated frosted glass surface on which transparencies can be laid for viewing. The light box also is used as a light source for photographic printing in combination with an overlying vacuum apparatus that holds the print material up, rather than down as in the conventional vacuum printing.

A lightweight vacuum box is provided which has a perforated undersurface having a panel lying above it provided with open channels to allow vacuum to be applied through the perforations. A vacuum hose is attached to the top of the vacuum box, and this is connected at the other end to a vacuum pump which preferably is controlled by a foot switch. The vacuum box is tipped up to an approximately vertical position, the original and copy material are placed against the perforated surface with the original disposed outwardly of the copy material, and the vacuum pump is turned on. The vacuum so developed holds the original and the print or copy material against the perforated surface of the vacuum box, which is then placed with the perforated surface down on top of a light table of a proper size to support the vacuum box. The light is then turned on by means of a timer for a predetermined time of exposure, and the light and vacuum pump are then subsequently turned off so that the print material may be removed and chemically or otherwise processed.

DRAWING DESCRIPTION

The invention will best be understood with reference to the following specification when taken in connection with the accompanying drawings wherein:

FIG. 3 is a cross-sectional view taken substantially along the 3—3 in FIG. 2;

FIG. 4 is an underside view of the vacuum box;

FIG. 5 is a some what stylized side view of the light box; and

FIG. 6 is a view similar to FIG. 5 showing the light box tipped up into an elevated position which is sometimes preferred for viewing transparencies.

DETAILED DESCRIPTION OF THE DISCLOSED EMBODIMENT

Figure 1:
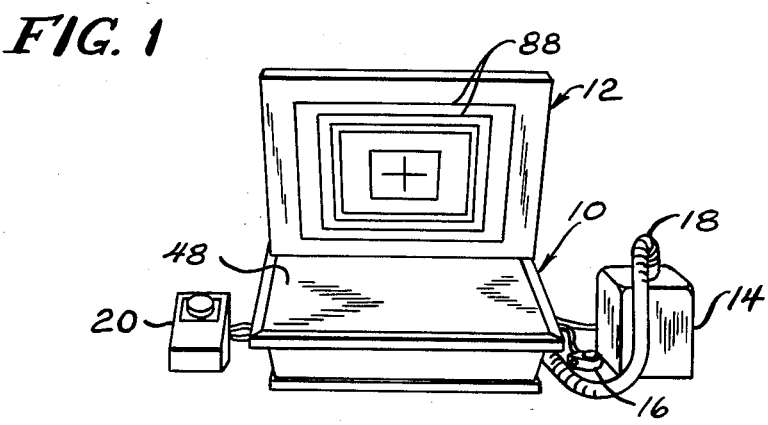
FIG. 1 is a perspective view of a light box and a vacuum box with the vacuum box tipped up, in combination with a light timer and a vacuum pump.
Figure 2:
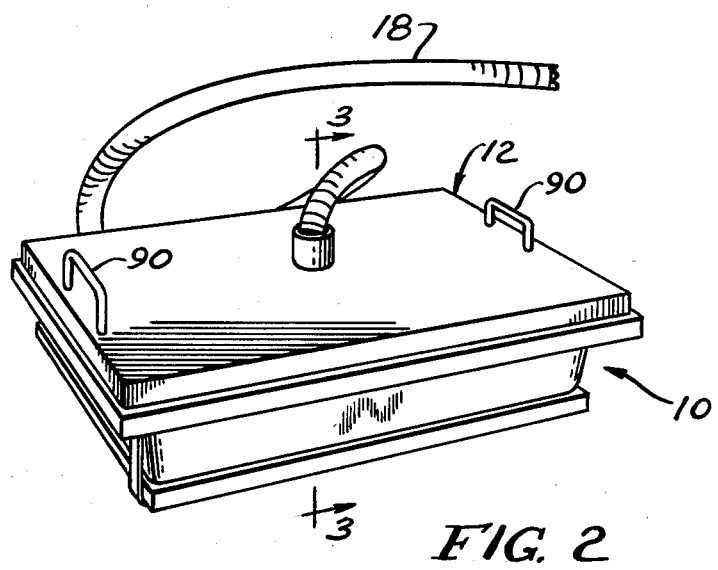
FIG. 2 is a perspective view showing the vacuum box disposed on the top of the light box.

Reference should now be made to the drawings, and first to FIGS. 1 and 2, wherein there is seen a light box 10 with a vacuum box 12 positionable thereon. A vacuum pump 14, controlled by a foot switch 16, is connected to the vacuum box by a flexible hose 18. A timer 20 is provided for controlling operation of the lights in the light box 10.

The light box, as seen also in FIG. 3, comprises a molded plastic structure having end walls 22, a bottom wall 24, and upstanding front 26 and back 28 walls. The aforesaid parts are all formed integrally. The bottom wall 24 has two upstanding inverted channels 30 leading from one end wall to the other, and having a valley 32 between them. The inverted channels 30 provide rigidity to the bottom wall 24, and also aid in light distribution. The front and back walls include initial upstanding portions 34 of substantially the same height as the inverted channels 30, and then offset shelves 36 leading to further upstanding portions 38 having shoulders 40 at the top thereof. Edge flanges 42 are spaced up from the shoulders 40.

Fluorescent light tubes 44 are supported above the floor or bottom wall 24 immediately adjacent the two inverted channels 30, respectively being spaced forwardly and rearwardly in close proximity thereto. Ballasts 46 for the respective fluorescent tubes 44 are also supported on the floor or bottom wall 24. The plastic material used in making the housing is of a shiny white characteristic, which combined with the shape of the bottom wall and front and side walls enhances distribution of the light from the fluorescent tubes 44 by reflection.

A ground glass panel 48 overlies the top of the rectangular housing 22, resting on the shoulders 40 and disposed interiorly of the flanges 42. The diffusion properties of the ground glass when combined with the reflectivity of the white surface of the remainder of the light box produces a substantially even illumination level across the outer surface of the ground glass. Accordingly, an original material to be copied and a light sensitive printing material can be disposed above the ground glass for printing. The evenness of illumination is somewhat enhanced slightly above the ground glass from what it is in actual contact therewith.

The light box is completed by a decorative trim channel 50 overlying the flange 42 and depending therefrom and at its lower edge having an inwardly directed flange. The channel 50 lies on all four sides of the light box.

The vacuum box 12 as seen in section in FIG. 3 preferably comprises a rectangular piece of plywood 52 having a subjacent sheet of the hardboard 62 glued to the underside thereof of molded plastic material 54, the whole being covered on the top and sides by a sheet. The plywood piece 52 is provided with a central aperture 56 which frictionally receives an upstanding plastic cylinder 58 into which the hose 18 is screwed. The hose has a helical configuration to permit leveling without kinking. An enlarged upstanding cylindrical portion 60 of the cylinder 58 is internally threaded for receipt of the hose.

The underside of the vacuum box 12 comprises the hardboard sheet 62 and an underlying perforated screen 64 adhesively secured in place. The screen preferably is of aluminum construction. The screen 64 is perforated over its entire extent, while the plate 62 is provided with a pattern of slots milled in its under surface readily seen in FIG. 5. Specifically, there are five rectangular slots 68, 70, 72, 74, and 76 of increasing dimension, and corresponding generally to common print sizes ranging from approximately 4×5 to approximately 14×18. There are also lateral slots 78 and longitudinal slots 80 extending across the width and length of the rectangular slots, and diagonal slots 82 and 84 extending between opposite corners. These radiating slots meet at the central circular aperture 86 into which the hose-receiving aperture 56 opens.

The sheet 62 and the perforated screen 64 preferably are painted black, and the plastic cover 54 also is black. Rectangular pattern white lines 88 are painted or printed on the undersurface of the perforated screen 64 for aid in positioning printing materials and transparencies.

To use the foregoing apparatus the vacuum box is tipped up, for example to the position of FIG. 1. This is readily effected by means of handles 90 received on top of the vacuum box adjacent the opposite ends thereof by means of screws 66. The sheet of photosensitive material is positioned against the vacuum box perforated screen 64 with the photosensitive side out. The transparency to be copied then is placed on the photosensitive material, and the vacuum pump 14 is turned on by means of the foot switch 16. It will be understood that the vacuum box may be in generally vertical position as shown in FIG. 1, or nearly substantially inverted at the convenience of the operator for placing of the photosensitive material and the transparency to be copied against the perforated screen. Once the vacuum pump 14 is turned on, the vacuum is applied through the slots and the perforations to hold the photosensitive material and the transparency flat against the screen. The vacuum box then is placed on top of the light box, as shown in FIGS. 2 and 3, and the light is turned on for a predetermined period by means of the timer 20 to make the necessary exposure. The vacuum pump 14 then is turned off by means of the foot switch (this is conveniently a push-on/push off switch) and the transparency and photosensitive material are removed for chemical or other appropriate development of the latent image on the photosensitive sheet.

An ancillary feature of the light box is illustrated in FIGS. 5 and 6. The light box 10 is mounted along its rear edge by means of a hinge 92 on a frame 94. The frame is of rectangular outline form, and the hinge is specifically affixed to the rear element thereof. Screw mounted foot pads 96 depend from the frame near the corners thereof for supporting the frame and the light box.

A travelling frame 98 carries a pair of rollers 100 which travel on top of the two end frame members 102. The travelling frame specifically includes a longitudinally oriented element 104 underlying both end frame members 102, with upstanding end elements 105 lying outwardly of the respective end frame members 102. Pins 108 on the respective upright elements 106 rotatably carry the rollers 100.

The end walls 22 of the light box are not flat, but are provided with indentations 110 of generally shallow triangular shape adjacent the front portion of the light box, thereby providing a ramp 112 at either end. The travelling frame 98 is normally positioned forwardly as shown in FIG. 5, so that the light box rests in level position on the frame 94. However, the travelling frame may be moved rearwardly to have the rollers 100 positioned beneath the nominally horizontal portion 114 of each end wall, whereby to support the light box in tilted position as shown in FIG. 6. The rollers can be positioned at an intermediate location to tilt the light box up at a lesser lesser angle. Many workers prefer to have a tilted or inclined ground glass surface for observing or working on transparencies.

Although the specific light box as shown and described herein as an important part of the vacuum printing apparatus, it will be understood that other light boxes could be used. The important thing is that the light box is usable for observation or revision of transparencies or negatives in the usual manner, and is also usable with the vacuum box for making photographic reproductions. The vacuum box is what might be termed free standing, in that it is readily manually moved to any position, and specifically including the downwardly facing printing position on top of the light box.

The specific example of the invention as herein shown and described will be understood as being exemplary only. Various changes in structure will no doubt occur to those skilled in the art, and will be understood as forming a part of the present invention insofar as they fall within the spirit and scope of the appended claims.

The invention is claimed as follows:

1. Vacuum printing apparatus comprising a relatively wide light box of shallow height, a movable manually positionable vacuum box having an upper surface and disposed above and resting on said light box, a vacuum pump disposed remotely relative to said light box and said vacuum box, said vacuum box comprising an overlying rigid backing piece and an underlying plate having downwardly opening slots therein arranged in a plurality of rectangles and additional slots extending longitudinally, laterally, and diagonally across said rectangles and communicating therewith, and an underlying perforated screen adhesively secured to the lower surface of said underlying plate, a flexible vacuum hose extending between said vacuum pump and said upper surface of said vacuum box, said vacuum box having an opening through said upper surface and said overlying backing piece and communicating with said slots, and a plurality of handles on said vacuum box for lifting and for manual positioning of said vacuum box.

2. Apparatus as set forth in claim 1 wherein said backing piece comprises a sheet of plywood and said underlying plate comprises a sheet of hardboard with said slots cut therein.

3. Vacuum printing apparatus comprising a relatively wide light box of shallow height, a movable manually positionable vacuum box having an upper surface and disposed above and resting on said light box, a vacuum pump disposed remotely relative to said light box and said vacuum box, said vacuum box comprising an overlying rigid backing piece and an underlying plate having downwardly opening slots therein arranged in a plurality of rectangles and additional slots extending longitudinally, laterally, and diagonally across said rectangles and communicating therewith, and an underlying perforated screen adhesively secured to the lower surface of said underlying plate, a flexible vacuum hose extending between said vacuum pump and said upper surface of said vacuum box, said vacuum box having an opening through said upper surface and said overlying backing piece and communicating with said slots, a plurality of handles on said vacuum box for lifting and for manual positioning of said vacuum box, an underlying support structure for said light box, hinge means connecting said light box along one edge thereof to said support structure, downwardly facing track means on said light box disposed substantially perpendicularly to said one edge, and means movable on said support structure parallel to said track means and having roller means thereon engageable with said track means for supporting said light box in adjustable position from substantially horizontal to inclined depending on the position of said movable means and said roller means.

* * * * *